United States Patent Office 3,175,335
Patented Mar. 30, 1965

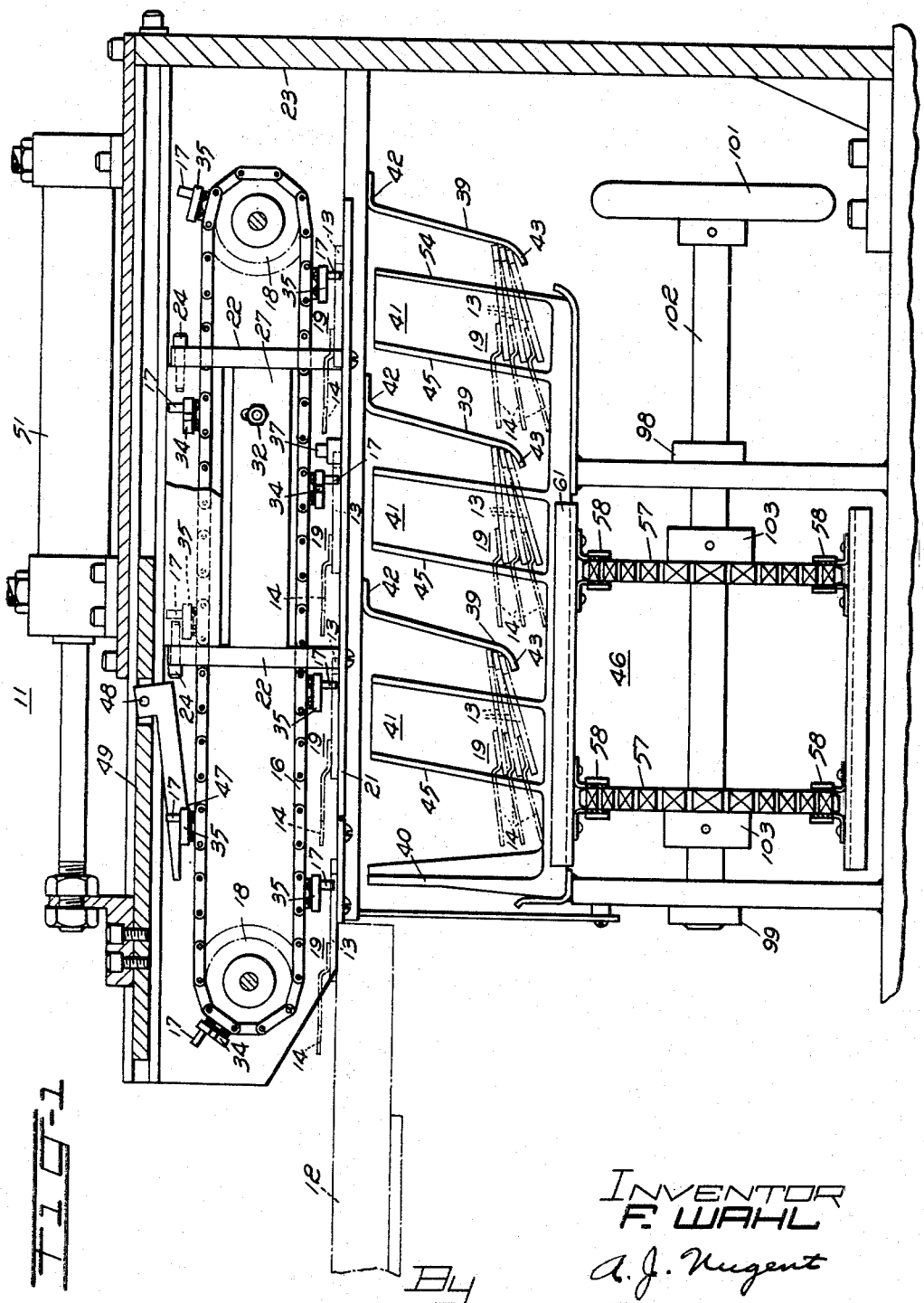

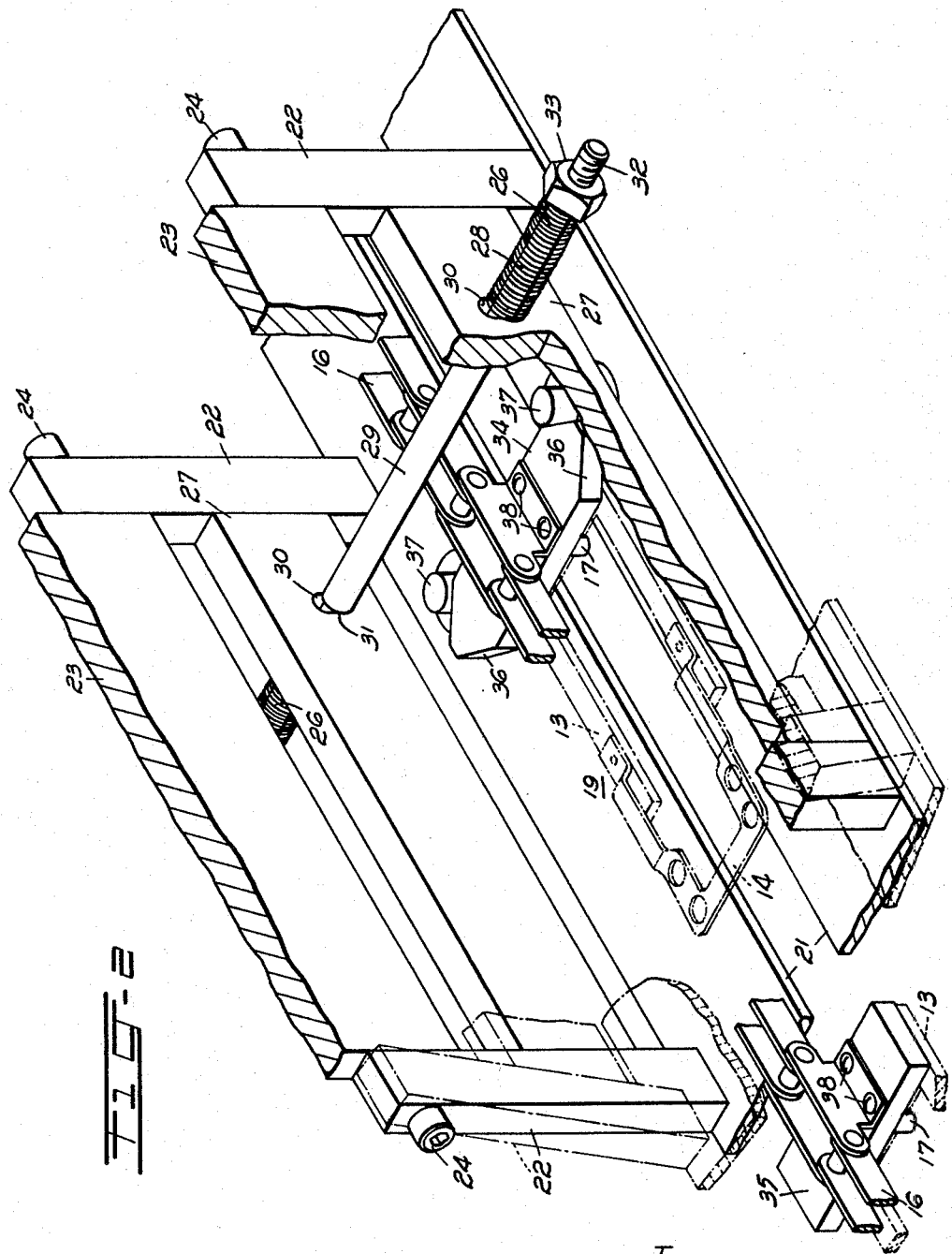

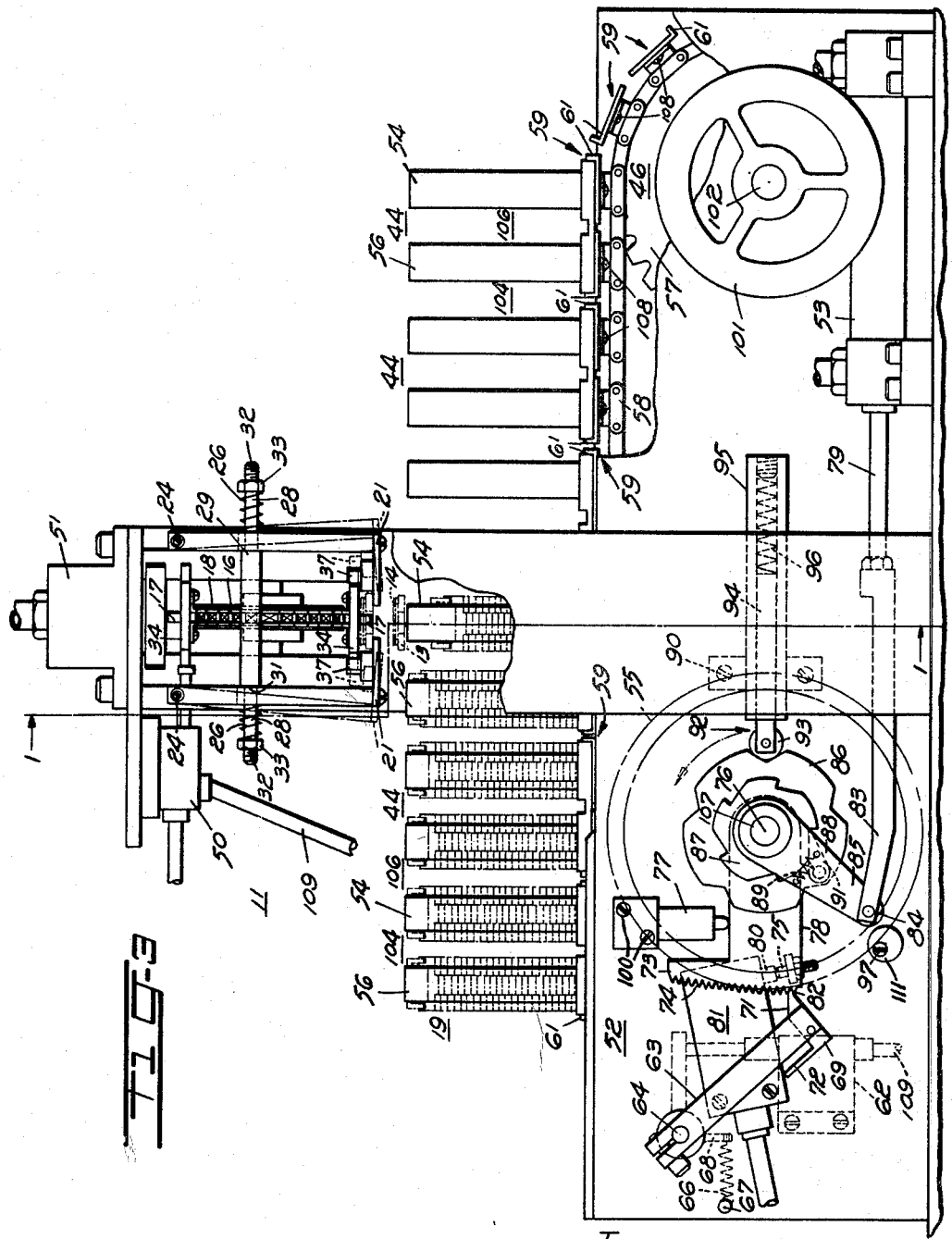

3,175,335
TRANSFER APPARATUS FOR LOADING PARTS
ONTO RECEPTACLES
Frank Wahl, North Bergen, N.J., assignor to Western
Electric Company, Incorporated, New York, N.Y., a
corporation of New York
Filed Apr. 5, 1962, Ser. No. 185,372
6 Claims. (Cl. 53—58)

This invention relates to transfer apparatus for loading parts onto receptacles and particularly to apparatus for ejecting and racking parts advanced from a work station.

Numerous transfer devices are commercially available on machines applicable to a variety of assembly operations. While such devices are well-known and in common usage, they have not been employed to any great extent in the manufacture of relays since relay assembly still proceeds largely on a manual basis with machines utilized only for particular operations. The aforementioned machines are generally of limited capability requiring manual feed and operation, features which are basically undesirable for large scale production. The application of Frank Wahl, Serial Number 111,356, filed May 19, 1961, now Patent No. 3,122,035 proposes to automatically rivet relay armatures and hinge springs. A new ejecting and racking apparatus, the subject of the present invention, has been developed to facilitate the high speed mass production of these relay subassemblies.

An object of this invention is to provide an apparatus for automatically transferring a predetermined number of parts from one position to another position.

Another object is to provide an apparatus for automatically ejecting and racking relay armature and hinge spring subassemblies following a machine operation.

A more specific object of this invention is an ejecting and racking apparatus for removing relay armature and hinge spring assemblies one at a time from a turret type assembly machine and loading them onto a plurality of receiving racks until a predetermined number of parts are located thereon.

In accordance with the general features of this invention, a transfer apparatus comprises means for transferring parts from a prior operation, a receiving unit for the parts, means for racking the parts on the receiving unit, a counter, and means actuated by the counter to remove the receiving unit when a predetermined number of parts are situated thereon and move another unit into position.

In greater detail, a transfer apparatus moves parts by separate protruding members from a machine onto spaced parallel supporting members until a specific number of parts are situated thereon. Then the pivotally mounted supporting members are forced away from each other and from beneath the parts dropping them onto separate racks of a receiving unit. After a first group of racks are loaded with parts, a counter activates a suitable means to move the filled racks out of loading position and move a succeeding group of racks into that position. This device is adaptable for use with a manual or automatic type machine and is particularly adaptable for use with an intermittently operable turret type machine, operating during the rest interval of said machine.

Other objects and advantages will be apparent from the following detailed description when considered in conjunction with the accompanying drawings, wherein:

FIG. 1 is a side view of the apparatus taken along the line 1—1 of FIG. 3, parts of which are broken away to illustrate the operation thereof;

FIG. 2 is a broken away isometric view showing the operation of the protruding members acting to permit racking of armature and hinge spring assemblies; and FIG. 3 is a broken away end view of the invention emphasizing the conveyorized disposition of the racked parts.

With reference to the drawings, the transfer apparatus 11 in a preferred embodiment is mounted at an ejecting station of an indexing machine 12 where subassemblies 19 comprising relay armatures 13 with attached hinge springs 14 are ejected after processing. The means for removing these subassemblies 19 includes an endless chain 16 having three sets of three protruding members 17 spaced at predetermined intervals along the chain. As the chain 16 moves about rotary members 18, the protruding members 17 contact successive subassemblies 19 spacing them longitudinally on laterally spaced shelves 21.

The shelves 21 are supported by arms 22 pivotally mounted to the frame 23 at 24 and held in a normal vertical position by springs 26 acting on the outer surface of the shelf members 27. The springs 26 are coiled about the outer end portions 28 of a spacer element 29 having a center portion 31 whose diameter is larger than the holes 30 in order to keep spring urged shelves 21 apart. The outer end portions 28 of the spacer element 29 are threaded at 32 to receive a nut 33 which restrains the compressive spring action directed away from the shelves 21.

One protruding member 17 in each set of three has a base portion 34 with cam-like ends 36 which engage oppositely situated pins 37 on the shelves 21 moving the shelves laterally apart as shown in phantom in FIG. 2. The two other protruding members have a block-type base 35 attached to the chain 16 by screw means 38 which misses the pins 37 and fails to actuate the shelves 21. While the member with a cam-like base 34 could be any one of the three protruding members in a set, it is preferably located between the other two members to pivot the shelves 21 about a central axis. A set of three assemblies 19 are being guided along the shelf 21 when the cam-like ends 36 contact the pins 37.

The released assemblies 19 fall down guided by inclined members 39 into a group of three separate receiving racks 41. One end of the inclined member is mounted to the frame 23 at 42 while the other end 43 extends angularly from the member to guide the assembly into position against a rack 41. Each rack 41 has a vertical member 45 inclined slightly from the vertical towards member 39 to receive the assemblies 19 which become positioned thereabout upon release. A vertical member 40 is provided at one end of a group of racks for handling purposes. The racks 41 are situated on a receiving unit 44 having two rows 54 and 56 of three racks to receive the group of parts. These units 44 are supported by and ride along a chain driven conveyor 46.

The endless chain 16 is advanced intermittently by a pusher 47 which is hinged at 48 to a slide 49 and engages the successive protruding members 17. The slide 49 is reciprocated by an air cylinder 51 during rest intervals of the aforementioned indexing machine 12. When one group of racks 54 is loaded, for example, with fifteen assemblies 19 on each rack 41, a counter 52 responsive to each racking operation will actuate air operated means 53 to move the conveyor 46 one position. This locates the second row of three racks 56 under the shelves 21. When the racks 56 are filled, the loaded receiving unit 44 is moved one position and is ready for manual removal from the conveyor. The spacing 104 between the units 44 is equal to the spacing 106 between the rows of racks 54 and 56 so that a succeeding unit is simultaneously moved into a loading position and the operation can function without interruption. Empty receiving units 44 are manually placed on the other end of the conveyor 46 in advance of the loading station. Of course, it is entirely possible to perform the loading and unloading of the receiving units 44 automatically rather than manually as illustrated.

The conveyor system 46 comprises pairs of sprockets, a first pair of driving sprockets 55 joined by shaft 107 and a second pair of driven sprockets 57 joined by shaft 102 and a chain 58 connecting the corresponding sprockets in each pair. Pairs of supporting elements 59 are spaced at intervals along the chain. The supporting elements 59 for the receiving units 44 are connected to the chain by a suitable means 108 and have projecting end portions 61 to confine and guide the units along.

The counter mechanism functions as follows to efficiently perform an operation usually requiring larger more expensive counters. A first air cylinder 62 responsive to the operation of valve 50, pivots a lever 63 hinged at 64. The valve 50 is actuated by contact with a cam-like base 34 on the upper part of the chain 16, pivoting the lever 63 on every third transfer operation. As air line 109 transmits the air flow from a central source (not shown) which supplies all air cylinders on the apparatus 11, in this case upon activation of valve 50. A spring 66 is fixed at 67 and attached to a pinned member 68 to return the lever 63 to a normal position after operation by the air cylinder 62. A member 69 having a triangular face 71 and an extending rear portion 72 is provided on the end opposite the pinned portion of the lever.

A member or gear sector 73 having a series of teeth 74 to mate with the triangular face 71 of the member 69 is pivotally mounted about 76. A plunger 77 which is secured to the frame 23 by screw means 110 maintains a pressure against a body portion 78 of the member 73. The body portion 78 includes an adjustable element 75 positioned to engage a switch contact 80 when the bottom tooth 82 is engaged. This switch 81 activates an air cylinder 53 having an arm 83 fixedly attached at one end to the piston rod 79 and pinned on the other end at point 84 to a linkage 85.

The driving sprockets 55, the cam 86, and the ratchet 87 are mounted on shaft 107 and are actuated by the air cylinder 53. A pawl 91 pivotally connected to the linkage engages the ratchet 87, rotating it one position during the return motion of the cylinder 53. A spring 89 pinned to the linkage 85 and to the pawl 91 is employed to maintain the pawl 91 against the ratchet 87. A cam follower 92 having a roller portion 93 and a rod 94 actuated by resilient means 96 stops the sprockets 55 upon completion of one cycle. The follower 92 is fixedly mounted on the frame 23 by screw means 90 attached to the supporting element 95 which contains the aforesaid cam follower components. Manual means mounted to the frame at 98 and 99 and comprising a hand wheel 101 and a shaft 102 are provided to rotate the pair of sprockets 57 through a pair of bearing connections 103 when desired.

In operation, the lever 63 pivots during each operation of the slide 49 engaging a different tooth in the series of teeth 74 on member 73 and gradually lifting an adjustable element 75 on the member 78 into contact with the switch 81. An eccentric stop 111 with a screw adjustment 97 is used to set the member 78 permitting a specific number of assemblies 19 to fall onto the racks 41. When the bottom tooth 82 is in engagement with the lever 63, the switch 81 is activated by contact with the adjustable element 75 to operate the cylinder 53 and move another group of racks into position. The plunger 77 provides sufficient pressure at that point to depress the portion 78 against the pressure of the lever 63 and return it to a start position against the stop 111.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:
1. A transfer apparatus comprising:
   a chain mechanism for removing relay armature and hinge spring assemblies from a previous location,
   protruding members on the chain to engage the assemblies,
   pivotally mounted shelf-like members onto which the assemblies are guided,
   pin members situated on the shelf-like members,
   cam members attached to some of the protruding members to engage the pins when one or more assemblies are being guided along the shelf-like members for pivoting them apart from one another,
   a plurality of receiving racks,
   a plurality of projecting members on the racks to receive the assemblies when the shelf-like members are moved apart,
   a counter, and
   a conveyor actuated by the counter to move the racks when a predetermined number of assemblies are situated thereon and move succeeding racks into position.
2. Apparatus in accordance with claim 1 including:
   resilient members urging the pivotally mounted shelf-like members into a normal vertical position.
3. Apparatus in accordance with claim 1 in which the counter comprises:
   means for registering successive racking operations,
   actuating means activated after a predetermined number of such operations,
   means responsive to the actuating means to drive the conveyor, and
   means for resetting the counter.
4. A transfer apparatus for continuously loading parts onto receptacles comprising:
   a pair of movable spaced parallel supporting members,
   a first carrier,
   a series of protruding members mounted on the first carrier for moving parts onto the supporting members until a predetermined number of parts are located thereon,
   a second carrier having supports mounted thereon for supporting receptacles which receive parts when in loading position beneath the first carrier,
   means for moving the supporting members from beneath the parts to drop the parts onto separate receptacles in a first group of receptacles,
   fluid drive means responsive to successive movements of the supporting members,
   a rotatable shaft for transferring movement from the fluid drive means to the second carrier,
   a member pivotally mounted to the shaft, having a series of counting teeth mounted on one end thereof and an intermediate body portion,
   a lever operatively connected to the fluid drive means, the lever having a wedge-shaped portion designed to engage successive counting teeth on the pivotally mounted member upon each loading operation in order to move the intermediate portion of the member into an actuating position after a predetermined number of parts have been counted, and
   means coupled to the shaft and actuable by the intermediate portion of the pivotally mounted member when a predetermined number of parts have been loaded onto a first group of receptacles for actuating the second carrier to move the first group of receptacles out of loading position and move a succeeding group of receptacles into loading position.
5. A transfer apparatus for continuously loading parts onto receptacles comprising:
   a pair of movable spaced parallel supporting members,
   a first carrier,
   a series of protruding members mounted on the carrier for moving parts onto the supporting members until a predetermined number of parts are located thereon, a second carrier having supports mounted thereon for supporting receptacles to receive parts when in loading position beneath the first carrier, means for moving the supporting members from beneath the parts to drop the parts onto separate receptacles in a first group of receptacles, a counter operatively connected to the moving means, a rotatable drive shaft for the second carrier, a cam fixedly mounted on the shaft and having a plurality of dwell surfaces, a spring-urged cam follower for engaging the cam dwell surfaces to maintain the cam in successive fixed positions each corresponding to a receptacle loading position, fluid drive means coupled to the shaft and actuable by the counter after a predetermined number of loading operations, a pair of driving sprockets mounted to the shaft, and means for transferring the motion of the sprockets to the second carrier after the counter has sensed the required number of loading operations to move the first group of receptacles out of loading position and move a succeeding group of receptacles into loading position.

6. In an apparatus for loading parts into racks, a pair of opposed, pivotally mounted support plates, means for resiliently biasing said plates into a horizontal position, a first carrier for advancing parts onto the plates, a plurality of spaced cam means mounted on said first carrier for cyclically pivoting the plates against the effect of the resilient means to drop the parts past said plates, a second carrier for supporting racks to receive said dropped parts, means for incrementally advancing said second carrier underneath said first carrier to move each rack into position to receive said dropped parts, a pivotally mounted gear sector, means operated by another of said cam means during the pivoting of said plates for pivoting said gear sector one increment, and means operated by said gear sector pivoting a predetermined number of increments for operating the second carrier advancing means.

References Cited by the Examiner

UNITED STATES PATENTS

| | | | |
|---|---|---|---|
| 1,393,642 | 10/21 | Rose | 53—78 |
| 2,236,945 | 4/41 | Gibbs | 53—160 |
| 2,310,347 | 2/43 | Berck | 235—132 |
| 2,581,859 | 1/52 | Hoye | 235—132 |
| 2,782,577 | 2/57 | Beall | 53—78 |
| 2,952,106 | 9/60 | Rostron | 53—160 X |
| 2,953,881 | 9/60 | Ellison | 53—78 |
| 3,018,595 | 1/62 | Harris et al. | 53—78 |
| 3,067,558 | 12/62 | Good | 53—164 X |

FRANK E. BAILEY, *Primary Examiner.*

ROBERT A. LEIGHEY, TRAVIS S. McGEHEE,
*Examiners.*